UNITED STATES PATENT OFFICE.

GEORGE S. HODGES, OF ORCHARD LAKE, MICHIGAN, AND JOHN M. TRACY, OF NEW YORK, N. Y.

WATER-COLOR PAINT.

SPECIFICATION forming part of Letters Patent No. 430,250, dated June 17, 1890.

Application filed January 20, 1890. Serial No. 337,508. (No specimens.)

*To all whom it may concern:*

Be it known that we, GEORGE S. HODGES, of Orchard Lake, in the county of Oakland and State of Michigan, and JOHN M. TRACY, of New York, in the county of New York and State of New York, citizens of the United States, have invented certain new and useful Improvements in Moist Water-Color Paint; and we do hereby declare the following to be a full, clear, and exact description of the invention, such as will enable others skilled in the art to which it appertains to make and use the same.

Our invention relates to new and useful improvements in water-color paints; and it consists in the mixing and commingling of certain ingredients, which will be more fully hereinafter described, and afterward definitely pointed out in the claims.

The object of our invention is to incorporate with distemper or water-color paints a vehicle which will impart thereto the quality of "flowing," which greatly facilitates the manipulation and improves the quality of the colors.

A further object of our invention is to provide moist water-color paints which will at all times retain their natural brilliancy and other essential characteristics, together with the all-important qualities of pliability, semi-plasticity, or moistness when in bulk, adapting them for immediate use and preventing their chipping or cracking.

Heretofore it has been found that distemper or water colors in a moist state are susceptible to changes of atmosphere and temperature and the changes common to certain colors in themselves, whereby they become greatly impaired in quality, which has rendered their use objectionable, and in some respects imperfect. Therefore, to form colors which will retain their plastic nature or pliability, overcoming these defects, and also to impart superior qualities thereto by adding certain ingredients which will distribute or flow the particles of color evenly over the surface of the paper, and which will not sour, mold, or crack, also quickly give up their color when being used, is the aim and purpose of our invention.

Our invention mainly consists in the incorporation of alcohol with water-color paints; and it further consists in the use of Russian isinglass, gum-arabic, and glucose, or their equivalents, mixed with finely-powdered color and alcohol.

In the preparation of our colors we first grind the colors in an impalpable powder, which we incorporate in a mixture of Russian isinglass, gum-arabic, glucose, and alcohol, in about the following proportions: Russian isinglass, one part; gum-arabic, one part; glucose, three parts, and alcohol, two parts. These we thoroughly mix after dissolving the respective portions of Russian isinglass and gum-arabic in the alcohol. After the above ingredients have been thoroughly mixed and compounded we then incorporate the powdered color in quantity sufficient to make the entire mass semi-plastic or pliable, in which condition it will remain indefinitely.

As stated, the principal feature of our invention is the incorporation with a water-color paint of alcohol or other spirituous liquid, adding greatly to the efficiency of the colors, which result is accomplished whether its use be with or without the above-mentioned ingredients, as the effect of the alcohol on the ordinary compounded color is, in some respects, the same as it is with our above-described compound. We have also found that in some cases the gum-arabic may be omitted and the Russian isinglass alone used, or vice versa, with equally good results, their use being governed by the nature of the color.

We are aware that changes in the above-described compound can be made by substituting equivalent ingredients for those described without departing from the nature and principle of our invention.

Having thus described our invention, what we claim as new, and desire to secure by Letters Patent, is—

1. A water-color or distemper paint compound consisting of a mixture of alcohol and distemper or water-color paint, substantially as described.

2. A water-color compound consisting of finely-powdered dry water-colors mixed with alcohol, Russian isinglass, gum-arabic, and glucose, substantially as described.

In testimony whereof we affix our signatures in presence of witnesses.

GEO. S. HODGES.
JOHN M. TRACY.

Witnesses:
L. S. BACON,
F. R. CORNWALL,
J. SCOTT HARTLEY,
ELLIOTT DAINGERFIELD.